Jan. 3, 1933.    S. H. CLARK    1,893,399
GASKET

Filed July 8, 1931

Inventor
Stewart H. Clark
By Depe & Kirchner
Attorneys

Patented Jan. 3, 1933

1,893,399

UNITED STATES PATENT OFFICE

STEWART HARVEY CLARK, OF UNION CITY, INDIANA

GASKET

Application filed July 8, 1931. Serial No. 549,555.

My invention relates to gaskets or weatherstripping especially adapted for use in sealing the cooperating surfaces of a pair of closure members. More particularly the invention relates to a device for sealing the abutting surfaces of the door and jamb of a refrigerator or the like.

It is an object of the invention to provide a gasket having a pair of relatively resilient fillers enclosed in spaced relation in a strip of covering fabric a portion of which is extended from one side of one of the fillers to constitute a tacking flange, the whole being fabricated out of a minimum of material.

A further object of the invention is to provide a gasket of the character indicated which may be produced from a strip of covering fabric which is provided on one surface with a moisture resistant coating, and so to dispose the covering fabric with relation to the enclosed fillers that the coated surface of the filler enclosing portions is outermost and the coated surface of the tacking flange is uppermost and exposed to view when the gasket is applied in operative position.

A further object of the invention is to provide an efficient, durable and attractive gasket at a minimum of expense and from a minimum of costly materials.

Other and further objects and advantages of the invention will become more apparent as the description hereinafter proceeds.

Figure 1:
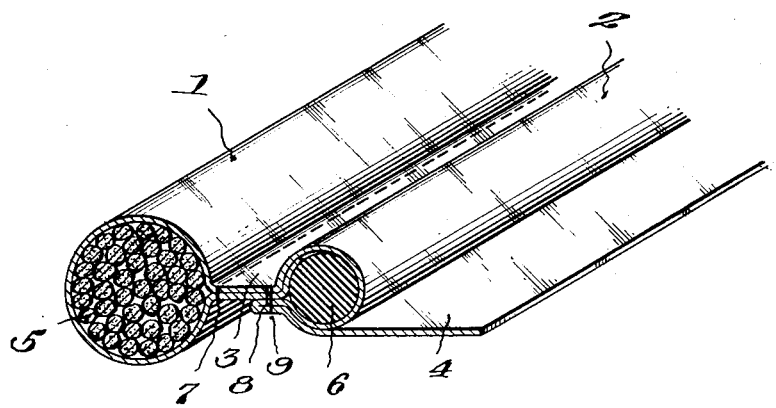
Figure 2:
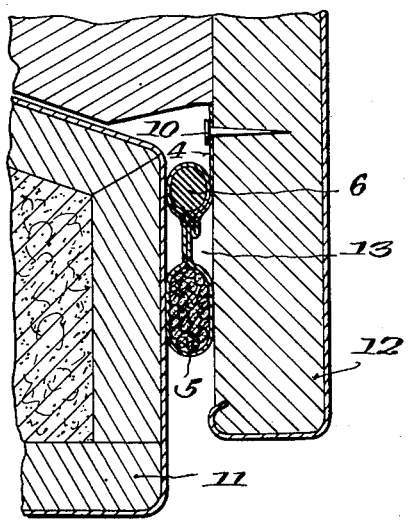
Figure 3:
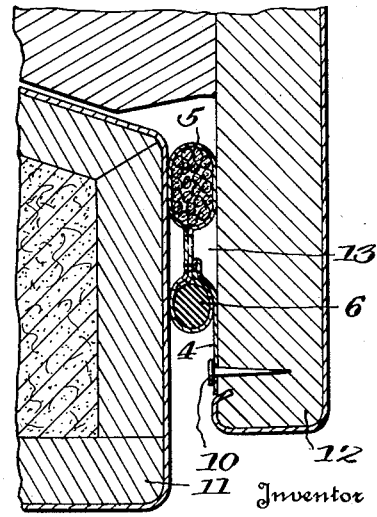

The invention is illustrated in one form of embodiment in the accompanying drawing which forms part of this application for Letters Patent in which the same reference character designates the same part in the several views, and in which Figure 1 is a relatively enlarged perspective view of a gasket embodying the invention, with one end thereof shown in cross section;

Fig. 2 is a relatively reduced cross sectional view of a refrigerator door and jamb showing an application of the gasket thereto; and Fig. 3 is a similar view showing a modified application of the gasket thereto.

Referring now to the drawing, and first to Fig. 1, the gasket contemplated by the present invention comprises in general a strip of covering fabric folded on itself to provide four principal parts, a bead 1, a second bead 2, an intervening spacing web 3, and a laterally extending tacking flange 4. The beads 1 and 2 are substantially cylindrical enlargements provided in the structure, each containing a relatively resilient filler which, when the gasket is applied, is adapted to seal the cooperating surfaces of a pair of closure members.

The covering fabric may consist of a single strip of textile material of cotton or its equivalent, provided on one surface with any suitable well known moisture resistant finish or coating. The material is thus any of the well known imitation leathers, oil cloths, rubberized fabrics or the like. It is an object of the invention to provide a gasket in which a pair of beads or sealing enlargements are formed in folds of the coated covering material and in which the covering material is so disposed that the coated surface lies outermost of the beads and uppermost of the tacking flange when the gasket is in applied position. The applied gasket thus presents an over-all coated outer surface, the uncoated reverse side of the covering material being completely concealed from view and protected from contact with moisture, dirt, etc. This object of the invention is accomplished by a novel series of folds formed in the covering material, which will hereinafter be described in detail.

The beads 1 and 2 are formed around and contain resilient fillers 5 and 6 respectively. These fillers may be provided in any suitable material having the desired property of being deformable under the compressive action of a pair of closure members and of being restored upon release of such compression substantially to its initial form, on account of its inherent resilience. Suitable filler materials include soft cotton rope or wicking, jute rope, soft rubber tubing, or solid rubber provided in the form of an extended cylinder of small diameter. While the size and material of the beads of the present gasket form no part of the invention, I prefer to employ soft cotton wicking as the filler 5 for bead 1, and a solid core of soft rubber as the filler 6 for bead 2, and to make bead 1 somewhat larger and more compressible than bead 2.

The manner in which the covering material is folded to enclose the pair of fillers and to produce the several parts of the gasket is best shown in Fig. 1. As is evident from Fig. 1, filler 5 is completely enclosed in a cylindrically folded portion of the covering material, which is secured with a line of stitches 7 snugly about the filler. The margins of the covering material are extended unequally and together folded about the second filler 6. The widths of the marginal portions are so proportioned that the shorter portion will terminate after only a few degrees of contact with the filler 6, while the wider portion will completely encircle the filler 6, with sufficient width remaining to provide the tacking flange 4. The portion of the covering material which completely encloses the filler 6 is secured to the two plies of the covering material which form the intermediate web 3 by a line of stitching 8. The second filler enclosing portion is then folded back upon itself, at the line of stitching 8, and a third line of stitching 9 is passed through both plies of the web 3 and through both plies of the folded back margin, to retain the folded back margin permanently in its reversed position. The width of this margin is proportioned to provide a laterally extending flange 4 of a width sufficient to receive conveniently a line of tacks or the like 10 as shown in Figs. 2 and 3.

It will be evident, from the description hereinabove, that the same side of the strip of covering fabric which is outermost of the fillers 5 and 6 is uppermost of the tacking flange 4. In practice of course this surface is the coated, finished side of the material. Consequently when the gasket is applied as shown in Figs. 2 and 3, or in any other convenient way, all of the uncoated surface of the covering material will be protected within the structure of the gasket, or will be concealed against the surface of the closure member to which the gasket is applied.

The gasket may be applied in various manners, depending upon the structure of the closure members with which it is to be associated, the preference of the user, and other considerations. Two such modes of application are shown in Figs. 2 and 3. In these figures 11 designates the door jamb and 12 the door of a popular type of refrigerator. The door 12 is provided with an outwardly extending flange portion, and the gasket is applied to this flange portion by tacks 10 passed through the tacking flange thereof. In Fig. 2 the larger and more resilient bead 1 lies nearer the outer periphery of the door, while in Fig. 3 the relative positions of this outer periphery and the filler 1 are reversed. It will be evident that the gasket may be applied to the door jamb instead of to the door. Furthermore the tacking flange 4 may be received beneath an overlying metal strip or flange provided on the door or jamb, or the gasket may be secured in operative position in any other convenient manner.

It will be evident that the structure hereinabove described provides a gasket which is superior in appearance, efficiency and durability to double bead gaskets in which a portion of the structure exhibits an uncoated surface of the covering fabric. It is believed to be evident also that the four-ply disposition of the structure next to the filler which is adjacent to the tacking flange 4 results in disposing the tacking flange in a more nearly tangential relation to its adjacent bead, so that the major portion of the intermediate web 3 is at all times, during the applied life of the gasket, maintained spaced away from the surface of the closure member to which the gasket is secured, thus providing a dead air space 13 between the two beads and the opposing surfaces of the web 3 and the closure member which is never completely destroyed, regardless of the extent to which the gasket structure may be flattened out by continued opening and closing of the door to which it is applied.

It is to be understood that I have shown and described the present invention in certain preferred forms of embodiment only, merely for purposes of exemplification. The invention is capable of embodiment in other and further modifications, but all such modifications, to the extent that they embody the principles of the invention as pointed out in the appended claims, are to be deemed within the scope and purview thereof.

Having thus described my present invention what I claim and desire to secure by Letters Patent is:

1. A gasket including a covering fabric folded upon itself to provide a pair of filler enclosing portions and an intervening web, a filler carried in each of said enclosing portions, one margin of the fabric being stitched to the web and then folded back oppositely upon itself to provide an outwardly extended tacking flange.

2. A gasket including a covering fabric provided on one surface with a moisture resistant coating folded upon itself to enclose, with its coated surface outermost, a pair of fillers, and forming therebetween an intervening web, one margin of the fabric being extended laterally from one of the fillers to provide a tacking flange having its coated surface uppermost.

3. A gasket including a pair of relatively resilient fillers, a strip of covering fabric stitched around one of said fillers, then extended to provide a double ply intervening web, then enclosing the second filler, one margin of the portion enclosing the second filler being stitched to the intervening web, then folded back oppositely upon itself and extended laterally from said second filler to provide a marginal tacking flange.

4. A gasket as claimed in claim 3 in which a third line of stitching passes through the intervening web and through the portion of the covering fabric which is folded back upon itself, whereby the folded back portion of the fabric is permanently secured to the web and in its folded back condition.

5. A gasket including a pair of resilient fillers, a strip of covering fabric enclosing said fillers in spaced relation, forming an intervening web therebetween and having a marginal portion extending laterally to provide a tacking flange, said intervening web including two plies of the fabric adjacent one of the fillers, and four plies of the fabric next to the filler adjacent the tacking flange, whereby said tacking flange is caused to extend substantially tangentially from said filler.

In testimony whereof I affix my signature.

STEWART H. CLARK.